(12) United States Patent
Rehm et al.

(10) Patent No.: US 11,376,578 B2
(45) Date of Patent: Jul. 5, 2022

(54) MICROREACTOR FOR PHOTOCATALYTIC REACTIONS

(71) Applicants: FRAUNHOFER-GESELLSCHAFT ZUR FÖRDERUNG DER ANGEWANDTEN FORSCHUNG E. V., Munich (DE); JULIUS-MAXIMILIANS-UNIVERSITÄT WÜRZBURG, Würzburg (DE)

(72) Inventors: Thomas Rehm, Mainz (DE); Anke Krüger, Würzburg (DE)

(73) Assignees: Fraunhofer-Gesellschaftzurförderung der angewandten Forschung e.V., Munich (DE); Julius-Maximilians-Universität Würzburg, Würzburg (DE)

( * ) Notice: Subject to any disclaimer, the term of this patent is extended or adjusted under 35 U.S.C. 154(b) by 0 days.

(21) Appl. No.: 17/046,176

(22) PCT Filed: Apr. 2, 2019

(86) PCT No.: PCT/EP2019/058272
§ 371 (c)(1),
(2) Date: Oct. 8, 2020

(87) PCT Pub. No.: WO2019/197217
PCT Pub. Date: Oct. 17, 2019

(65) Prior Publication Data
US 2021/0154651 A1    May 27, 2021

(30) Foreign Application Priority Data

Apr. 13, 2018  (DE) ..................... 10 2018 205 630.7

(51) Int. Cl.
*B01J 19/00* (2006.01)
*B01J 19/08* (2006.01)
(Continued)

(52) U.S. Cl.
CPC ......... *B01J 35/004* (2013.01); *B01J 19/0093* (2013.01); *B01J 19/127* (2013.01);
(Continued)

(58) Field of Classification Search
CPC ........ B01J 19/00; B01J 19/0093; B01J 19/08; B01J 19/12; B01J 19/122; B01J 19/127;
(Continued)

(56) References Cited

U.S. PATENT DOCUMENTS 8,986,532 B2 * 3/2015 Hamers ............... C25B 1/55
205/340
9,751,849 B1  9/2017 Basheer et al.
(Continued)

FOREIGN PATENT DOCUMENTS

CN    106311110 A   1/2017
EP    1 398 077 A   3/2004
(Continued)

OTHER PUBLICATIONS

Roy et al., "Boron-doped diamond semiconductor electrodes: Efficient photoelectrochemical $CO_2$ reduction through surface modification," *Sci. Rep.* 6: 38010 (2016).
(Continued)

*Primary Examiner* — Natasha E Young
(74) *Attorney, Agent, or Firm* — Leydig, Voit & Mayer, Ltd.

(57) ABSTRACT

The present invention relates to a device for the photocatalytic reduction of a substance with a structured reaction plate and/or a structured housing, wherein the reaction plate has, at least in some regions, a surface which contains a material with negative electron affinity and which can be electronically excited with radiation having a wavelength of ≥180 nm.

24 Claims, 5 Drawing Sheets

(51) Int. Cl.
   *B01J 19/12* (2006.01)
   *B01J 19/24* (2006.01)
   *B01J 35/00* (2006.01)

(52) U.S. Cl.
   CPC ............... *B01J 2219/00783* (2013.01); *B01J 2219/00806* (2013.01)

(58) Field of Classification Search
   CPC . B01J 19/24; B01J 35/00; B01J 35/002; B01J 35/004; B01J 2219/00; B01J 2219/00781; B01J 2219/00783; B01J 2219/00788; B01J 2219/00801; B01J 2219/00804; B01J 2219/00806; B01J 2219/00819; B01J 2219/00835; B01J 2219/00891; B01J 2219/00925; B01J 2219/00934; B01J 2219/00943
   See application file for complete search history.

(56) References Cited

U.S. PATENT DOCUMENTS

| 2007/0009403 A1 | 1/2007 | Ehrfeld et al. |
| 2017/0028378 A1 | 2/2017 | Hamers et al. |

FOREIGN PATENT DOCUMENTS

| EP | 2 708 280 A | 3/2014 |
| JP | 2017-100901 A | 6/2017 |
| WO | WO 2013/115872 A1 | 8/2013 |

OTHER PUBLICATIONS

Zegkinoglou et al., "Electronic Structure of Diamond Surfaces Functionalized by Ru(tpy)$_2$," *J. Phys. Chem. C.* 116(26): 13877-13883 (2012).

Zeiler et al., "Diamond Coatings—a New Approach for Wear Protection of Titanium Alloys" *World conference on titanium; Titanium'99 : science and technology* 2: 884-891 (2000).

European Patent Office, International Search Report in International Application No. PCT/EP2019/058272 (dated Aug. 9, 2019).

European Patent Office, Written Opinion in International Application No. PCT/EP2019/058272 (dated Aug. 9, 2019).

International Bureau of WIPO, International Preliminary Report on Patentability in International Application No. PCT/EP2019/058272 (dated Oct. 13, 2020).

Bandy et al., "Photocatalytic reduction of nitrogen to ammonia on diamond thin films grown on metallic substrates," *Diamond & Related Materials* 64: 34-41 (2016).

Grögler et al., "Growth stages of chemical vapor deposited diamond on the titanium alloy Ti-6A1-4V," *Diamond & Related Materials* 6(11): 1658-1667 (1997).

Grögler et al., "Microwave-plasma-CVD of diamond coatings onto titanium and titanium alloys," *Surface Coat. Tech.* 98(1-3): 1079-1091 (1998).

Hamers et al., "Atmospheric-pressure photoelectron emission from H-terminated and amino-terminated diamond," *Physica Status Solidi A* 213(8): 2069-2074 (2016).

Liang et al., "Deagglomeration and surface modification of thermally annealed nanoscale diamond," *J Colloid Interface Sci* 354(1): 23-30 (2011).

Manickam-Periyaraman et al., "Dyes decolorization using silver nanoparticles supported on nanometric diamond as highly efficient photocatalyst under natural Sunlight irradiation," *Journal of Environmental Chemical Engineering* 4(4)A: 4485-4493 (2016).

Wöhrle et al., "Photochemie: Konzepte, Methoden, Experimente," (Photochemistry: Concepts, Methods, Experiments), Chapter 9, "Anhang" (Appendix), VCH Press, pp. 487-515 (1998).

Zhang et al., "Selective Photoelectrochemical Reduction of Aqueous $CO_2$ to CO by Solvated Electrons," *Angew Chem Int Ed* 53(37): 9746-9750 (2014).

Zhu et al., "Amino-terminated diamond surfaces: Photoelectron emission and photocatalytic properties," *Surface Science* 650: 295-301 (2016).

Zhu et al., "Photo-illuminated diamond as a solid-state source of solvated electrons in water for nitrogen reduction," *Nat Mater* 12: 836-841 (2013).

\* cited by examiner

MICROREACTOR FOR PHOTOCATALYTIC REACTIONS

CROSS-REFERENCE TO RELATED APPLICATIONS

This patent application is the U.S. national phase of International Application No. PCT/EP2019/058272, filed on Apr. 2, 2019, now WO 2019/197217 A1, which claims the benefit of German Patent Application No. 10 2018 205 630.7, filed Apr. 13, 2018, the disclosures of which are incorporated herein by reference in their entireties for all purposes.

BACKGROUND OF INVENTION

Field of Invention

The present invention relates to a device for photocatalytic reduction of a substance, having a structured reaction plate and/or a structured housing, the reaction plate having, at least in regions, a surface which comprises a material with negative electron affinity and which can be excited electronically with radiation of a wavelength of ≥180 nm.

Many diamond materials have a "negative electron affinity". This property means that electrons of the crystal lattice, in the case of interaction with electromagnetic radiation of a sufficiently low wavelength, are excited from the valence band into the conduction band. Since the conduction band is situated above the energy level of the vacuum, such excited electrons leave the crystal lattice and accumulate on the surface of the crystal. The irradiation of the diamond material hence leads to a charge separation and to the accumulation of electrons on the surface of the diamond material.

The negative potential which is produced consequently on the surface of the diamond material can be used for the reduction of chemical substances.

However, diamond materials have a very large band gap of approx. 5.5 eV between valence- and conduction band. In order to excite an electron from the valence band into the conduction band, energy-rich ultraviolet radiation with a wavelength of $\lambda < 225$ nm must therefore be used. This is disadvantageous for the application of diamond materials for selective reduction of substances.

On the one hand, there is only a small number of radiation sources which make available radiation of this wavelength with acceptable power and intensity (e.g. laser, mercury low pressure lamps, Xe-excimer lamps). This leads to a process based on the above-described diamond materials being economically unprofitable since the procurement and the operation of these radiation sources are very cost- and energy-intensive.

On the other hand, many of the possible substances to be reduced themselves absorb the high-energy UV radiation. As a result, they react in an uncontrolled manner and are degraded at least partially. Specific conversion of any chemical substance into a desired compound is therefore made difficult and the usable substances are restricted to a small number of molecules which do not absorb in the case of the used UV radiation.

For example, R. Hamers et al. describe in various scientific articles (D. Zhu, L. Zhang, R. Ruther, R. Hamers, *Nat. Mater.* 2013, 12, 836-841; L. Zhang, D. Zhu, G. Nathanson, R. Hamers, *Angew. Chem. Int. Ed.* 2014, 53, 9746-9750; *Diamond* 2016, 64, 34-41; D. Zhu, J. Bandy, S. Li, R. Hamers, *Surface Sci.* 2016, 650, 295-301) experiments and applications with diamond as photocatalytically activatable diamond material and a laser as radiation source. Because of the laser as high-energy radiation source, only simple molecules, such as nitrogen, carbon dioxide and nitrogen oxide, were able to be reduced in these studies.

Therefore, there are already various approaches in the literature in which the energy levels of diamond materials can be manipulated and the band gap of valence- and conduction band can be reduced.

Such an approach is mentioned in WO 2013/11 5872 A1 and in US 2017/0028378 A1. It is indicated here that it is advantageous to use a diamond doped with foreign atoms instead of pure diamond as photocatalytically activatable diamond material. As foreign atoms, both electron acceptors, e.g. boron, and electron donors, e.g. phosphorus or nitrogen, are thereby possible.

In addition, it is known that the application properties of boron-doped diamond as photocatalytically activatable diamond material are further improved if silver nanoparticles are added. These can be deposited either on the doped diamond or crosslinked covalently to the surface of the doped diamond (N. Roy, Y. Hirano, H. Kuriyama, P. Sudhagar, N. Suzuki, K.-i. Katsumata, K. Nakata, T. Kondo, M. Yuasa, I. Serizawa, T. Takayama, A. Kudo, A. Fujishima, C. Terashima, *Sci. Rep.* 2016, 6, 38010; P. Manickam-Periyaraman, S. Espinosa, J. Espinosa, S. Navalón, S. Subramanian, M. Alvaro, H. Garcia, *JECE,* 2016, 4, 4485-4493).

A further publication (I. Zegkinoglou, P. Cook, P. Johnson, W. Yang, J. Guo, D. Pickup, R. González-Moreno, C. Rogero, R. Ruther, M. Rigsby, E. Ortega, R. Hamers, F. Himpsel, *J. Phys. Chem. C,* 2012, 116, 13877-13883) describes the influence of a ruthenium complex bonded to a diamond on the HOMO- and LUMO-energy levels of the diamond.

However, to date the problem is entirely unresolved as to how diamond materials can be provided with suitable band gap energy in a reduction process such that the effective reduction rate is not limited by the diffusion rate of the substance to be reduced.

In the state of the art, test units are mainly disclosed in which the reduction of the photocatalytically activatable substances are implemented in a batch approach (discontinuously). For this purpose, closed systems are used in which the catalyst is surrounded by a liquid phase (e.g. WO 2013/115872 A1, JP 2017-100901 A).

In JP 2017-100901 A, the gaseous substances to be reduced are introduced for example through a capillary and are available only in the form of rising gas bubbles in the liquid phase for contacting with the catalyst.

Such a test arrangement and -implementation is however not optimal since the contacting between gas and catalyst surface and hence also the reduction of the substance to be reduced takes place only incompletely and not efficiently. In addition, closed reaction vessels in which products can accumulate in the course of time and are not removed from the process are unfavourable. This applies above all for the conversion of carbon dioxide since here undesired byproducts, such as e.g. formic acid, formaldehyde and methanol are concentrated in the reaction vessel. These byproducts can have a negative effect on the course of the desired reduction reaction.

Tests in R. Hamers, J. Bandy, *Phys. Status Solidi A* 2016, 213, 2069-2074 deal in contrast with a gas-solid system and with the transition of photocatalytically released electrons into the gas chamber at the phase limit to the surface of a diamond material. As gas media, air, argon and sulphur hexafluoride were used here.

Therefore it is the object of the present invention to provide a device and a method in which diamond materials are provided as representatives of materials with negative electron affinity with a suitable band gap energy such that the influence of microkinetics (diffusion) on the effective reaction rate during the reduction of a substance to be reduced is negligible. Likewise, the device and the method are intended to be suitable for implementing the reduction continuously and with high selectivity and high throughput.

This object is achieved by the features of the device described herein, the use thereof and the method described herein.

BRIEF SUMMARY OF THE INVENTION

According to the invention, a device for photocatalytic reduction of a substance which comprises at least one reactor housing with reaction plate disposed therein is made available, the reaction plate and/or the reactor housing having a structuring and being insulated electrically from each other, the reactor housing consisting, at least in regions, of a material which is transparent for radiation of a wavelength of ≥180 nm, the reaction plate having, at least in regions, a surface which comprises a material with negative electron affinity and which can be excited electronically with radiation of a wavelength of ≥180 nm.

The radiation with a wavelength of 180 nm which is used preferably concerns electromagnetic radiation.

The electrical insulation of reaction plate and reactor housing ensures that the electrons which accumulate on the surface of the reaction plate after the electronic excitation are available for a reduction reaction of a substance to be reduced.

The transparent material of the reactor housing ensures that the radiation of an external radiation source which emits light with a wavelength of 180 nm can penetrate into the reactor and impinge on the reaction plate.

The use of light with a wavelength 180 nm enables the specific reduction of many substance classes which can be converted, not product-specifically, when using shortwave UV radiation. It is preferred that the reaction plate can be excited electronically even at a wavelength of 220 nm, in particular 380 nm.

The structuring of the reaction plate and/or of the reactor housing is preferably a microstructuring. It produces a greater surface-to-volume ratio and also a greater absolute surface which can be irradiated with the radiation. On the other hand, it assists the formation of the liquid thin film which enables a more efficient material transport of the substance to be reduced through the liquid to the catalyst surface. By means of the more efficient material transport, the reactor can be operated in addition at lower pressure so that the liquid charged with the reduced product is also degassed again more easily.

DETAILED DESCRIPTION OF THE INVENTION

In one embodiment, the structuring of the reaction plate and/or of the housing is a regular structuring of the surface. Preferably, the structuring is formed by cavities on the surface of the reaction plate and/or of the reactor housing with a depth between 100 and 1,500 pm, in particular 150 to 1,200 μm.

In the variant in which the reaction housing is structured, it is preferred if the structuring is present on the side of the housing which is orientated towards the reaction plate. In this way, the structuring is situated in the interior of the device during operation.

Preferably, the structuring of the reaction plate and/or of the reactor housing is suitable for the formation and transport of a liquid thin film with a film thickness of max. 120 μm, in particular 10 to 100 μm. Furthermore, it is advantageous if the structuring comprises at least one channel-like depression and it is particularly preferred if the structuring consists of a plurality of channel-like depressions. The at least one channel-like depression can thereby extend along a preferential flow direction of the liquid thin film. A preferential flow direction of the liquid thin film is preset for example by gravitation and/or capillary forces. Preferably, the at least one channel-like depression has a channel depth of 100 to 1,500 μm, particularly preferably of 100 to 400 μm. The width of the channel-like depressions is preferably of 300 to 1,200 μm, particularly preferably of 300 to 800 μm.

The channel-like depressions can extend completely in a straight line and be disposed parallel to each other. Likewise, it is possible that the channel-like depressions extend slightly curved or intersect.

Intersecting channel-like depressions can produce a diamond-shaped structuring. The cross-sectional profile of the channel-like depressions can describe the form of a circular or elliptical section. Alternatively, the channel-like depressions can have a flat channel base and perpendicular, angled and/or bevelled channel walls. In a further embodiment, the channels themselves can also have a sub-structuring, e.g. a herringbone pattern. A sub-structuring can improve even further the transport of a gaseous substance to be reduced to the surface of the reaction plate.

As a result of the dimensioning and number of channel-like depressions on the reaction plate, the device can be adapted flexibly to the requirements and to the conditions of the reaction. By increasing the number of channel-like depressions in the reaction plate or by enlarging the reaction plate, the throughput can be increased. By lengthening the channel-like depressions, the dwell time of the reaction solution in the reactor can be extended and possibly designed suitably for as complete a conversion as possible. A combination of both physical extensions (increase in the number and lengthening), produces the possibility of fundamentally adapting the reactor design. Also a so-called numbering-up with a plurality of devices according to the invention enables adaptation to the respectively required conversion quantity without requiring to adapt the reaction course in detail.

In a further embodiment of the invention, the material with negative electron affinity is selected from the group consisting of doped or pure diamond, boron nitride, silicon carbide, gallium nitride, gallium arsenide and mixtures hereof, preferably from the group consisting of boron-doped diamond, nitrogen-doped diamond, phosphorus-doped diamond, boron nitride, silicon carbide, gallium nitride, gallium arsenide and mixtures hereof.

Doping of the diamond materials or of the further materials with negative electron activity causes a reduction in the bandwidth energy between valence- and conduction band. Hence, doped diamond materials can also absorb electromagnetic radiation from the visible range in order to make available free electrons for the reduction reaction which takes place on the diamond surface. In this way, a substantially greater number of chemical substances can be converted by this heterogeneous catalysis system. Degradation of the substances which occurs increasingly in irradiation of the substances with shortwave UV light can be avoided. This effect is based on a change in the crystal structure of the diamond lattice by exchange of carbon atoms with boron (p-doping) or nitrogen- or phosphorus atoms (n-doping). The incorporation of dislocations takes place already in the production of the diamond material.

The material with negative electron affinity can be photosensitised or bonded covalently to at least one photosensitiser. The covalent bond hereby makes an electron transfer possible.

Photosensitisation is a process in which a photochemical or photophysical change in an atom or molecule occurs as a result of the light absorption by another molecule which is termed photosensitiser. The photosensitiser is not consumed during the reaction (D. Wöhrle, M. Tausch, W.-D. Stoher: Photochemie: Konzepte, Methoden, Experimente, VCH Press, 1998).

The at least one photosensitiser is thereby preferably a compound with an absorption wavelength of ≥180 nm, particularly preferably of 250 nm to 800 nm, very particularly preferably of 380 nm to 780 nm.

Preferably, the energy difference between the highest occupied molecular orbital (HOMO) and the lowest unoccupied molecular orbital (LUMO) of the photosensitiser corresponds to at least half of the energy which is required to excite an electron from the valence band of the material with negative electron affinity into the conduction band (i.e. approx. half of the band gap energy). As a result, a 1-photon absorption process during irradiation with the shortwave UV light can be replaced by a 2-photon absorption process during irradiation with longer-wave light, e.g. visible light, and gentler reaction conditions can be produced. Instead of exciting electrons in the material with negative electron affinity by means of shortwave UV radiation in one step, electrons of the photosensitiser are excited in two successive steps with visible light. In addition, an electron- and/or energy transfer process between the photosensitiser and the material with negative electron affinity is effected so that electrons in the material with negative electron affinity can be excited from the valence-into the conduction band.

Preferably, the at least one photosensitiser is an organic or organometallic colourant. The colourant can be selected from the group consisting of rylene diimide derivatives (e.g. core-substituted naphthalene diimides or perylene diimides), squaraines, porphyrines, phthalocyanines; xanthene colourant derivatives, e.g. rhodamine, fluoresceine, Bengal pink or eosin y; metal complexes of the porphyrines and phthalocyanines; noble metal complexes, e.g. ruthenium- or iridium complexes; non-noble metal complexes, e.g. iron- or manganese complexes with at least one pure or mixed ligand based on heterocyclic compounds, in particular iron- or manganese complexes with pure or mixed pyridine ligands; and mixtures hereof. Of these colourants, in particular the xanthene colourant derivatives and the metal complexes of porphyrines and phthalocyanines are preferred since these are simple to produce and can be obtained economically.

In a variant of the device, the reaction plate consists entirely of a material with negative electron affinity.

In another variant, the reaction plate consists of a material with negative electron affinity and a coating comprising a photosensitiser. Preferably, the material with negative electron affinity is functionalised and crosslinked covalently to the photosensitiser.

In a third variant, the reaction plate consists of a substrate and a surface coating, the coating comprising at least one material with negative electron affinity. The substrate thereby has preferably the form of a structured plate. The surface coating is preferably applied on the substrate in regions, in particular however over the whole area. Preferably, the surface coating is applied on at least 90%, preferably at least 95%, of the entire surface of the substrate. The coating, in addition to the material with negative electron affinity, can also comprise a photosensitiser.

A reaction plate which consists of a material with negative electron affinity and a coating comprising a photosensitiser is demanding in production. It must be ensured that the coating adheres permanently on the material with negative electron affinity. This is problematic in particular in the case in which the material with negative electron affinity is diamond or doped diamond since these solid materials show low reactivity, which makes bonding of organic molecules difficult. In example 2, a method for the production of a coating or functionalisation is indicated.

Methods for bonding organic molecules to materials such as diamond etc, which can be arylated in situ, e.g. by conversion of the materials with diazonium salts, are also known from Y. Liang, T. Meinhardt, G. Jarre, P. Vrdoljak, A. Schöll, F. Reinert, A. Krueger, *J. Colloid Interface Sci.*, 2011, 354, 23-30. By choice of suitable organic reaction partners, a covalent crosslinking to the (metal)organic units can be produced. Further covalent bonds are in addition possible, e.g. via cycloaddition reactions or C-C-crosslinking reactions.

The substrate is selected preferably from a material from the group consisting of metal, steel, ceramic, non-oxide ceramic, plastic material and mixtures hereof.

Advantageously, the device comprises in addition at least one direct radiation source and/or a reflector and/or a mirror. The direct radiation source can thereby be selected from the group consisting of a laser, a light-emitting diode, e.g. an LED, an OLED or a QLED, a gas discharge lamp, e.g. a mercury low pressure lamp, a daylight lamp, a sodium vapour lamp or a deuterium lamp, and the sun. Particularly preferably, a natural radiation source, e.g. the sun, is selected as direct radiation source.

By using a radiation source and a mirror, a two-sided irradiation of the reaction plate can be achieved. For this purpose, for example a parabolic mirror can be installed in the light path of the sun (or another illumination source) behind the reactor housing. In this way, direct frontal irradiation of the reaction plate by the sun (or by another illumination source) is possible and indirect irradiation of the rear-side of the reaction plate by the reflection of (sun) rays in the parabolic mirror.

The use of an artificial light source, e.g. an LED, as radiation source enables a wavelength-specific adaptation of the irradiation source to the absorption spectrum of the system made of material with negative electron affinity and the possibly present photosensitiser crosslinked to the material.

The reactor housing of the device according to the invention can have at least one inlet and at least one outlet for the supply of the educts and discharge of the products. In particular, the reaction housing has two inlets and two outlets, the first inlet being particularly preferably a liquid inlet, preferably being disposed at the head of the reactor housing and opening into a distributor structure which extends in the head region of the reactor housing horizontally over a predominant part of the width of the reaction plate, and the second inlet being particularly preferably a gas inlet, and being disposed preferably on the base of the reactor housing and opening into a further distributor structure or a diffuser structure which extends in the base region of the reactor housing horizontally over a predominant part of the reaction plate and leading to uniform distribution of a gas.

In addition, it is preferred if the reactor housing is manufactured from a plurality of components, for example from two halves.

Liquid and gas can be guided towards each other in counterflow or in parallel flow by providing a plurality of inlets. The liquid inlet is preferably disposed at the head of the reactor housing in order that the liquid thin film can be propagated as a result of gravity alone and at least the large number of channel-like depressions or else the total reaction plate is made wet by the liquid thin film. The distributor structure contributes to a uniform distribution of the liquid thin film over the entire width of the reaction plate.

One of two preferably present outlets in the reactor housing is preferably provided for the continuous discharge of the liquid, whilst the second of two preferably present outlets can serve for discharging the gas in continuous operation of the device.

Advantageously, the reactor housing, apart from the at least one inlet and at least one outlet, is configured to be fluid- and/or gas-impermeable.

In a further variant, the reaction plate is connected to an external voltage source. With the help of the external voltage source, the electron deficit in the material with negative electron affinity can be equalised again.

Alternatively, the equalisation of the electron deficit is possible via the oxidation of an aid which is fed in addition into the device.

The reactor housing advantageously has a cooling circulation, independent of the reaction plate, for cooling the reaction plate. The use of circulating liquid phase flows hereby allows specific cooling of the system made of the material with negative electron affinity and the photosensitiser possibly connected thereto. The cooling assists the long-term stability of the device which is subject to a constant, intensive irradiation.

A cooling circulation independent of the reaction plate is operated preferably with a cooling liquid and is defined by active cooling of the reactor housing or of the reaction plate without the cooling liquid physically touching the structured (and possibly functionalised) surface of the reaction plate and/or of the housing. Cooling circulation and reaction chamber are separated fluidically but connected to conduct heat. The cooling effect is manifested preferably by the reaction plate and/or the housing being in heat-conducting contact with the reaction plate surface and the coating of the reaction plate (e.g. diamond coating), as a result of its extremely high heat conductivity (diamond: 2,300 W/m K; copper: 401 W/m K; heat conductive paste: <73 W/m K), transporting and transmitting both reaction heat and heat introduced by radiation conductively to the cooling circulation to the housing.

In a variant, the device for photocatalytic reduction of a substance can comprise a plurality of reactor housings with reaction plate disposed therein, the reactor housings being preferably connected together. This variant, in which the smallest units of the device are coupled to form a module, allows the throughput of fairly large quantities and fairly large production capacities.

Alternatively, also the size of the device can be adapted to the specifications to be maintained (upscaling of the device).

In the method according to the invention for photocatalytic reduction of a substance in the above-described device comprising a reactor housing with reaction plate disposed therein, a liquid and the substance to be reduced are introduced into the device such that a liquid thin film is formed on the surface of the reaction plate, through which the substance to be reduced diffuses, the reaction plate is irradiated with light of a wavelength of ≥180 nm so that electrons are excited and accumulate on a surface of the material with negative electron affinity and the electrons reduce the substance to be reduced which has diffused through the liquid thin film. The method according to the invention is implemented continuously.

It can be ensured by the continuous operation that the products are constantly conveyed out of the reactor. The process conditions do not deteriorate or change with time but rather remain constant over the entire process time period.

The liquid thin film preferably has a film thickness of 5 to 150 µm, preferably of 10 to 100 µm, very particularly preferably of 25 to 60 µm.

In the method, preferably electrons from the HOMO of a photosensitiser which is connected to the material with negative electron affinity are excited. Particularly preferably, then an energy- or electron transfer to the material with negative electron affinity takes place. Subsequently, an electron deficit in the photosensitiser can be equalised by the electrons being transferred from the material with negative electron affinity to the photosensitiser, and/or an electron deficit, produced by the reduction of the substance to be reduced, being equalised in the material with negative electron affinity, via a connection to an electrical voltage source. Alternatively, also equalisation of the electron deficit is possible via the oxidation of an aid fed in addition into the device.

After the electron transfer from the photosensitiser to the material with negative electron affinity, the accumulated electrons preferably migrate out of the crystal lattice of the material with negative electron affinity to the surface thereof and are available for reduction of the substance to be reduced.

The substance to be reduced is advantageously gaseous, liquid or solid. Particularly preferably, the substance to be reduced is gaseous. Furthermore, it is preferred if the substance has a high solubility in the liquid. Particularly preferably, the substance is conducted in dissolved or dispersed state in the liquid thin film over the reaction plate. The liquid is preferably selected from the group consisting of water, propylene carbonate, N,N-dimethylformamide, methanol and other short-chain alcohols, hexamethylphosphoric triamide and mixtures hereof. Very particularly preferably, the liquid is chosen as a function of the desired film thickness of the liquid thin film and the desired flow rate and also the dimensioning of the reaction plate (cf. example 4 for selection of the liquid).

Since, with increasing film thickness, the diffusion of a gaseous substance to be reduced into the liquid thin film or the diffusion of a dissolved substance within the thin film towards the surface of the reaction plate deteriorates, preferably solvents with a dynamic viscosity of 0.4 to 1.6 mPa s, particularly preferably of 0.5 to 1.0 mPa s, are chosen.

According to the invention, also a use of the abovementioned device for photocatalytic reduction of a substance is provided, preferably for reduction of a substance selected from the group consisting of nitrogen, carbon dioxide, sulphur oxide, nitrogen oxide and organic molecules, in particular organic molecules comprising a benzene ring, and also mixtures hereof, particularly preferably using sunlight and/or visible light with a wavelength of ≥180 nm, very particularly preferably of 250 nm to 800 nm, in particular of 380 nm to 780 nm.

The present invention is intended to be described in more detail on the basis of the subsequent examples and Figures without wishing to restrict said invention to the individual embodiment variants.

EXAMPLE 1 FOR THE PRODUCTION OF A REACTION PLATE

By way of example, the process starts in this example with titanium as material for the substrate of the reaction plate. The substrate cut to size is processed with the help of spark erosion in order to provide it on both sides with channel-like depressions extending parallel to each other. Normally, the width of the channel-like depressions is 600 µm and the depth thereof 200 µm. Other dimensions are however likewise possible, e.g. 1,200 µm width and 400 µm depth or 300 µm width and 100 µm depth.

The number and the length of the channel-like depressions are essentially dependent upon the dimensioning of the device (e.g. the falling film microreactor), in which the finished reaction plate is intended to be inserted finally. It is assumed here, by way of example, that 32 channel-like depressions per side of the substrate are produced, which have respectively a length of 79.4 mm. The total channel volume is 609.8 µl in this case.

The substrate produced in this way is cleaned, subsequently electropolished and etched in a bath of a solution comprising HCl and sulphuric acid at increased temperature. Subsequently, the substrate prepared in this way is coated in order to provide a reaction plate in the sense of the present invention. The growth of the boron-doped diamond film is effected according to methods known from the literature (T. Grögler, E. Zeiler, M. Dannenfeld, S. Rosiwal, R. Singer, *Diamond & Related Materials*, 1997, 6, 1658-1667; T. Grögler, E. Zeiler, A. Hörner, S. Rosiwal, R. Zeiler, *Surf Coat. Tech.*, 1998, 98, 1097-1091; E. Zeiler, T. Grögler, G. Heinrich, S. Rosiwal, R. Singer, *Titanium '99: Science and Technology, Proceedings of the Ninth World Conference on Titanium*, 2000, 1, 884-891.) and takes place in a CVD furnace under hydrogen gas-, methane gas- and trimethylborane flow. As a result, a homogeneous diamond layer of approx. 4 µm thickness is produced on the microstructured substrate.

The thus prepared reaction plate is vapour-coated at suitable points outside the structuring with a thin gold layer in order to provide electrical contact points.

EXAMPLE 2 METHOD FOR THE FUNCTIONALISATION/COATING WITH PHOTOSENSITISER

The functionalisation of the diamond surface is implemented wet-chemically and is based on the introduction of a linker unit with an azide group for subsequent coupling to an alkyne function (Click Chemistry).

In the first step, the diamond-coated reaction plate is made completely wet at 80° C. with an aqueous solution of isopentylnitrite and the linker molecule, e.g. 4-azidoaniline. The in situ diazotisation of the linker molecule leads, at increased temperature via splitting of molecular nitrogen, to the carbon-carbon bond formation to the diamond surface and hence to a functionalisation of the diamond surface with azide groups. The plate is thereupon cleaned and rinsed multiple times with water and acetone.

In the second step, the azide-functionalised reaction plate is made completely wet with an aqueous dimethylformamide solution which comprises an alkyne-functionalised photosensitiser, e.g. iron(II)-(4'ethinyl-2,2':6',2-terpyridine) (2,2':6',2-terpyridine), and also copper sulphate and sodium ascorbate. In this coupling step, the azide unit of the surface bonds with the alkyne unit of the photosensitiser forming a stable covalent-bonded triazole linker unit. The plate is cleaned and rinsed also after this step multiple times with water and acetone.

EXAMPLE 3 FOR A METHOD USING THE REACTION PLATE

By way of example, the reduction here of carbon dioxide ($CO_2$) in an aqueous liquid thin film is illustrated. A reaction plate (both sides respectively 32 channel-like depressions; 600 µm deep; 200 µm wide; 64 mm long), coated with a boron-doped diamond film which is functionalised with a bis(terpyridine)iron(II) complex ($\lambda_{max}$=580 nm), was incorporated in the described falling film microreactor.

By means of an HPLC pump, water is pumped into the reactor with a flow rate of 1 ml/min in order to wet the channel-like depressions with a continuous water thin film. By distributing the total water flow to all 64 channel-like depressions, a water thin film with a thickness of on average 50 µm with a dwell time of approx. 3 seconds is formed in each channel-like depression.

The $CO_2$ is introduced into the device as gas and guided in counterflow to the liquid film. The gas flow rate is 20 ml/min and the gas flow is distributed uniformly on both sides of the reaction plate.

The system pressure is adjusted to 4 bar by a retaining pressure valve. A voltage is applied between the reaction plate in the falling film microreactor and a platinum net which is immersed in a product vessel. The electrical potential between the platinum net in the product vessel and the reaction plate in the falling film microreactor is maintained below 2 V. Under these conditions, an LED array which is used as radiation source is switched on and the reduction process starts.

The gas-liquid reaction mixture is collected in the product vessel and both the gas phase and the liquid phase are analysed by gas chromatography with mass detector. In the gas phase, there are $CO_2$, CO, methane and ethane. In the liquid phase, formic acid, formaldehyde and methanol are contained.

EXAMPLE 4 FOR THE SELECTION OF THE LIQUID

For a microchannel dimension of 600 μm width and 200 μm depth, in the case of methanol (density: 0.79 g/ml at 20° C.; dynamic viscosity: 0.544 mPa s at 20° C.), a theoretical film thickness of 45 μm and at a flow rate of 0.5 ml/min is formed. This corresponds to a dwell time of approx. 8 seconds in a 79 mm long channel.

A fourfold flow rate of 2 ml/min leads to a film thickness of 70 μm and a dwell time of 1.1 seconds.

The change to water (density: 1 g/ml at 20° C.; dynamic viscosity: 1 mPa s at 20° C.) as solvent leads under the same technological conditions to a theoretical film thickness of 51 μm and 3.1 seconds dwell time (at 0.5 ml/min) or 80 μm film thickness and 1.2 seconds dwell time (at 2 ml/min).

The change to an even more viscous solvent, e.g. propylene carbonate (density: 1.21 g/ml at 20° C.; dynamic viscosity: 2.8 mPa s at 20° C.) leads correspondingly to a theoretical film thickness of 67 μm and a dwell time of 4.1 seconds (at 0.5 ml/min) or 106 μm and 1.6 seconds dwell time (at 2 ml/min).

Figure 1:
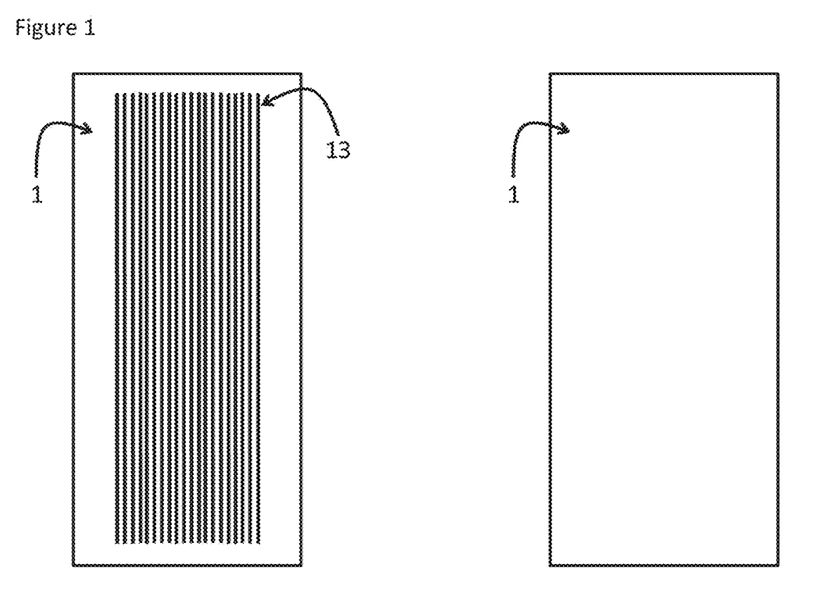
FIG. 1 illustrates the front- and rear-side of a reaction plate.

In FIG. 1, the front- and rear-side of a reaction plate is shown. The reaction plate 1 is manufactured either completely from a diamond material (or another material with negative electron affinity) or composed of a substrate and a coating. The coating is applied on the front-side of the reaction plate and comprises at least one material with negative electron affinity. The structuring 13 is likewise present only on the front-side and consists of a large number of parallel, straight-line channel-like depressions. The channel-like depressions are situated on a surface which corresponds to at least 50% of the total surface of the reaction plate.

Figure 2:
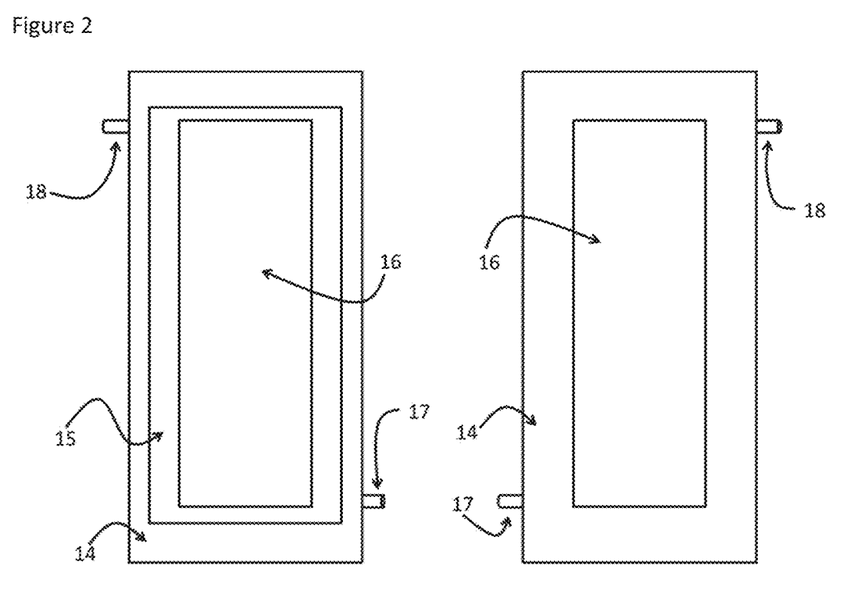
FIG. 2 illustrates the side (left) orientated towards the reaction plate and the side (right) orientated away from the reaction plate of a first half of the reactor housing.

In FIG. 2, the side (left) orientated towards the reaction plate 1 and the side (right) orientated away from the reaction plate 1 of a first half 14 of the reactor housing is illustrated. The side of the base plate orientated towards the reaction plate 1 has a sink 15 for inserting the reaction plate 1. Furthermore, the illustration shows, on both sides of the reactor housing part, a window 16 made of a colourless material which is transparent for light of the wavelength ≥180 nm. Also the inlet for the heat exchanger liquid 17 and the outlet for the coolant liquid 18 can be seen in both illustrations.

Figure 3:
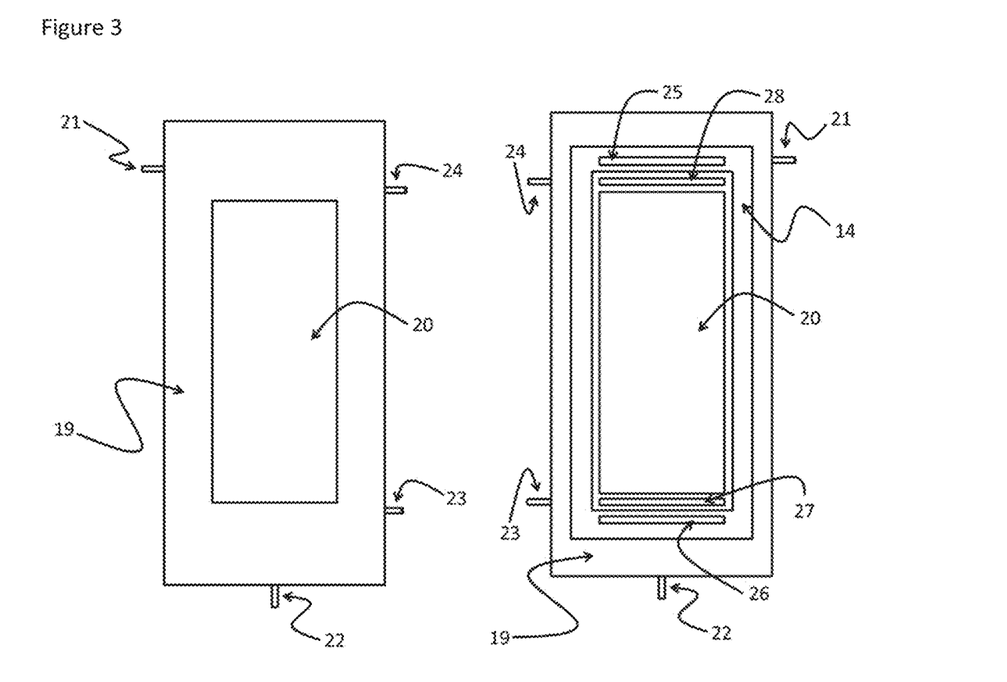
FIG. 3 illustrates the side (left) orientated away from the reaction plate and the side (right) orientated towards the reaction plate of a second half of the reactor housing.

FIG. 3 shows the side (left) orientated away from the reaction plate 1 and the side (right) orientated towards the reaction plate of a second half 19 of the reactor housing. The side orientated towards the reaction plate 1 has a window 16 made of a colourless material which is transparent for light of the wavelength ≥180 nm. Furthermore, the inlets and/or outlets (21, 22, 23, 24) and the corresponding distributor structures (25, 26, 27, 28) are shown. The liquid can be conducted through the liquid inlet 21 into the device. The liquid inlet 21 opens into the first distributor structure 25 which is configured as a slot and discharges the liquid uniformly over the entire width of the reaction plate 1. The first distributor structure 25 ensures that the reaction plate 1 is made completely wet. A gaseous substance to be reduced can be supplied to the device through the gas inlet 23. Here, a second distributor structure 27 is provided. The liquid discharge is ensured through the liquid outlet 22. This connects to a third distributor structure 26 to which a reverse function is assigned, namely collecting the liquid which is distributed over the entire width of the reaction plate 1. The gas discharge can be effected through the fourth distributor structure 28 and the gas outlet 24. Gas outlet 24 and gas inlet 23 can however also be exchanged in their function so that liquid and gas are guided in parallel flow within the device.

Figure 4:
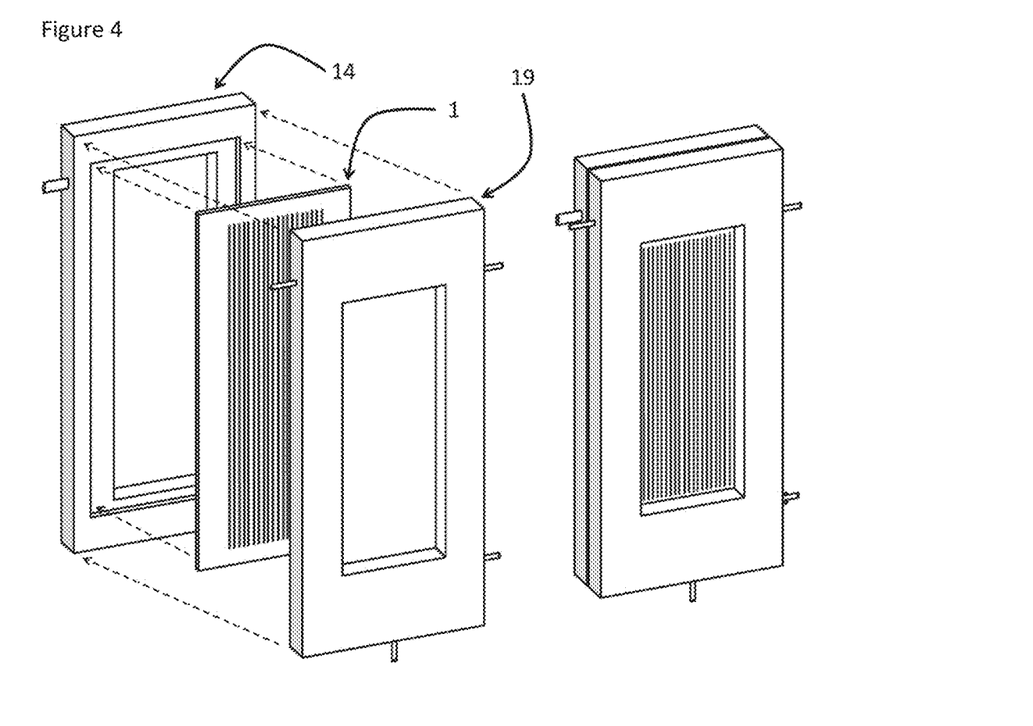
FIG. 4 illustrates an exploded illustration of a device according to the invention with a first half of the reactor housing, a reaction plate and a second half of the reactor housing (left) and finished assembled device (right).

FIG. 4 shows an exploded illustration of a device according to the invention with a first half 14 of the reactor housing, a reaction plate 1 and a second half 19 of the reactor housing (left) and finished assembled device (right).

Figure 5:
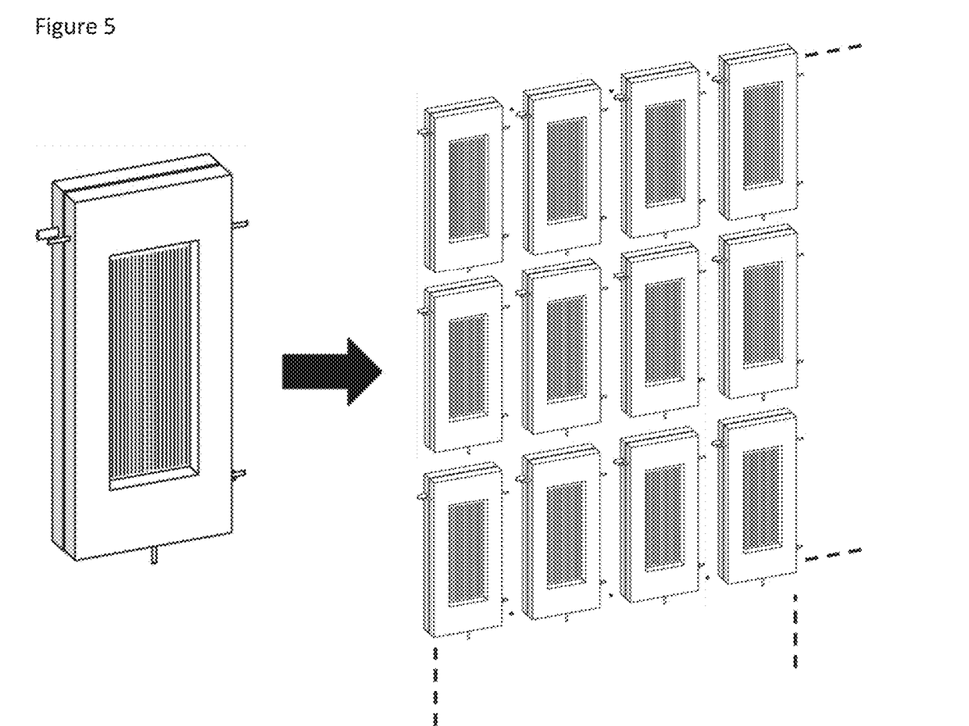
FIG. 5 illustrates the device according to the invention.

In FIG. 5, the device according to the invention is illustrated as module. A plurality of reactor housings with reaction plates contained therein are coupled together here.

Figure 6:
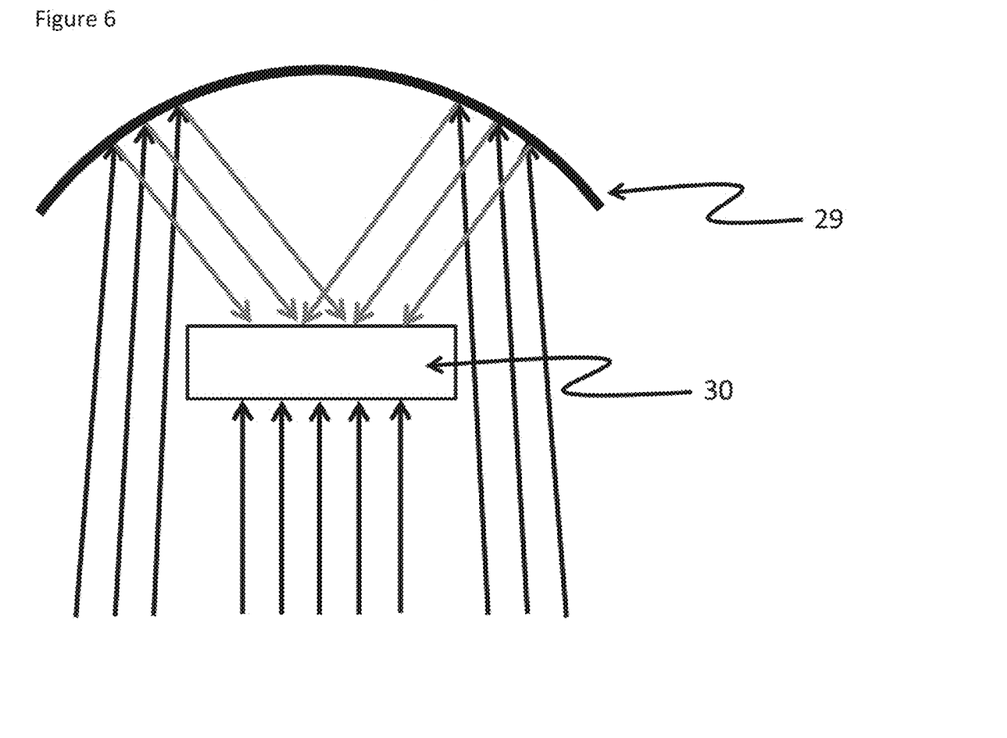
FIG. 6 illustrates an embodiment of the device according to the invention.

FIG. 6 shows an embodiment of the device according to the invention in which a reactor housing 30 is irradiated with natural sunlight and a parabolic mirror 29 is installed in the light path of the sun behind the reactor housing. In this way, radiation can impinge on the device from two opposite directions.

Figure 7:
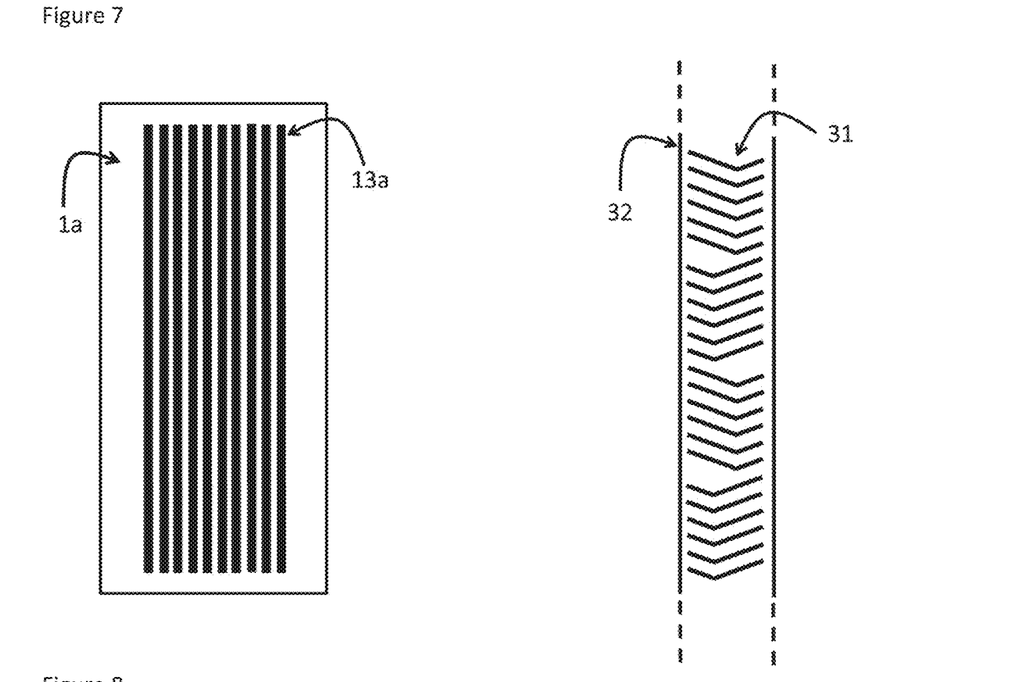
FIG. 7 illustrates the front-side of a reaction plate which has a modified structuring.

FIG. 7 shows the front-side of a reaction plate 1a which has a modified structuring 13a. The modified structuring 13a consists of a plurality of parallel channels which have a sub-structuring 31. In the enlargement 32 of one of these modified, channel-like depressions, it can be detected clearly that the sub-structuring 31, which is configured here as herringbone pattern, has been made very filigree. Whilst the width of the channel-like depressions is approx. 1 mm, the width of the cavities which are produced by the sub-structuring is at less than 0.5 mm.

Figure 8:
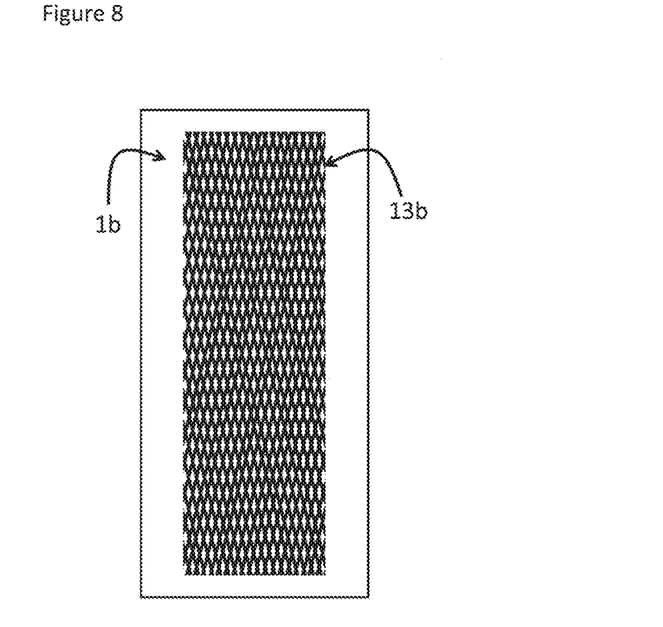
FIG. 8 illustrates the front-side of a reaction plate.

FIG. 8 shows the front-side of a reaction plate 1b. The reaction plate 1b thereby has channel-like depressions 13b which intersect at regular spacings. In the entire impression, a structuring with diamond-shaped raised portions is hence produced.

Figure 9:
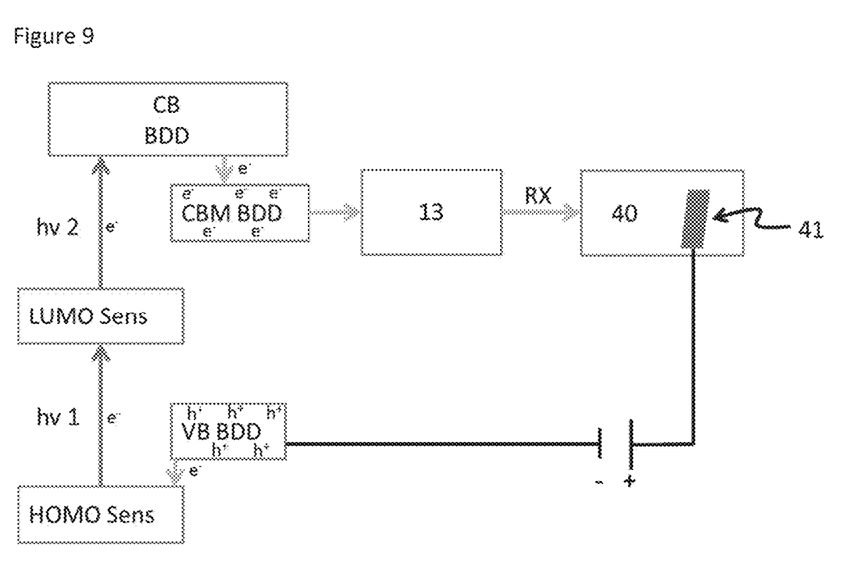
FIG. 9 illustrates schematically the electronic excitation states and the transfers of an electron in the method according to the invention.

FIG. 9 shows schematically the electronic excitation states and the transfers of an electron in the method according to the invention. By absorption of a photon of energy hv1, an electron is excited from the highest occupied molecule orbital (HOMO Sens) into the lowest unoccupied molecule orbital of the photosensitiser (LUMO Sens). A further transfer of the electron into a level of the conduction band of the boron-doped diamond material (CB BDD) is triggered by the absorption of a second photon with the energy hv2. From this level, thermalisation to the band edge (CBM BDD) is effected, at the level of which then the emission of the electron from the crystal lattice onto the surface of the reaction plate 13 takes place. After the substance to be reduced has been reduced by absorption of an electron (reaction RX), the reaction products are collected in a product vessel 40. Also the counterelectrode 41 which typically consists of a platinum net, is immersed in the product vessel 40. The electron deficit in the HOMO of the sensitiser, which is produced by excitation and transfer of an electron into the LUMO thereof, is filled again by an electron from the valence band of the boron-doped diamond (VB BDD). The electron deficit ($h^+$) produced consequently in the valence band of the boron-doped diamond material is filled again via the applied current source at low voltage.

The invention claimed is:

1. A device for photocatalytic reduction of a substance comprising at least one reactor housing with a reaction plate disposed therein, the reaction plate and/or the reactor housing having a structuring and being insulated electrically from each other, the reactor housing consisting, at least in regions, of a material which is transparent for radiation of a wavelength of ≥180 nm, and the reaction plate having, at least in regions, a surface which comprises a material with negative electron affinity and which can be excited electronically with radiation of a wavelength of ≥180 nm;

wherein the structuring comprises at least one channel-like depression, wherein the at least one channel-like depression extends along a preferential flow direction of the liquid thin film.

2. The device according to claim 1, wherein the structuring of the reaction plate and/or of the reactor housing are/is suitable for the transport of a liquid thin film with a film thickness of max, 120 µm.

3. The device according to claim 1, wherein the material with negative electron affinity is selected from the group consisting of doped or pure diamond, boron nitride, silicon carbide, gallium nitride, gallium arsenide, and mixtures thereof.

4. The device according to claim 1, wherein the material with negative electron affinity is bonded covalently to at least one photosensitizer.

5. The device according to claim 4, wherein the at least one photosensitizer is a compound with an absorption wavelength of ≥180 nm.

6. The device according to claim 4, wherein the at least one photosensitizer is an organic or organometallic colorant.

7. The device according to claim 6, wherein the organic or organometallic colorant is selected from the group consisting of rylene diimide derivatives, squaraines, porphyrines, phthalocyanines, xanthene colourant derivatives, metal complexes of the porphyrines and phthalocyanines, noble metal complexes, non-noble metal complexes, and mixtures thereof.

8. The device according to claim 1, wherein the reaction plate consists entirely of a material with negative electron affinity or consists of a substrate with a surface coating, comprising a material with negative electron affinity.

9. The device according to claim 8, wherein the substrate is a material selected from the group consisting of metal, non-oxide ceramic, plastic material, and mixtures thereof.

10. The device according to claim 1, wherein the device comprises in addition at least one direct radiation source and/or a reflector and/or a mirror.

11. The device according to claim 10, wherein the direct radiation source is selected from the group consisting of a laser, a light-emitting diode, a gas discharge lamp, and the sun.

12. The device according to claim 1, wherein the reactor housing has at least one inlet and at least one outlet for the supply of educts and discharge of products.

13. The device according to claim 12, wherein a first inlet is a liquid inlet.

14. The device according to claim 12, wherein a second inlet is a gas inlet.

15. The device according to claim 14, wherein the reactor housing, apart from the at least one inlet and at least one outlet, is fluid- and/or gas-impermeable.

16. The device according claim 1, wherein the reaction plate is connected to an external voltage source.

17. The device according to claim 1, wherein the reactor housing has a cooling circulation, independent of the reaction plate, for cooling the reaction plate.

18. The device for photocatalytic reduction of a substance according to claim 1, comprising a plurality of reactor housings with a reaction plate disposed therein.

19. A continuous method for photocatalytic reduction of a substance in a device comprising a reactor housing with reaction plate disposed therein according to claim 1, in which a) a liquid and the substance to be reduced are introduced into the device such that a liquid thin film is formed on the surface of the reaction plate, through which the substance to be reduced diffuses, b) the reaction plate is irradiated with light of a wavelength of ≥180 nm so that electrons are excited and emitted from the surface of the material with negative electron affinity, and c) the electrons reduce the substance to be reduced which diffuses through the liquid thin film.

20. The method according to claim 19, wherein the liquid thin film has a film thickness of 5 to 150 µm.

21. The method according to claim 19, wherein electrons of a photosensitizer being excited, which photosensitizer is connected to the material with negative electron affinity.

22. The method according to claim 19, wherein the substance to be reduced is a gas, liquid, or solid.

23. A continuous method for photocatalytic reduction of a substance in a device comprising a reactor housing with reaction plate disposed therein, the reaction plate and/or the reactor housing having a structuring and being insulated electrically from each other, the reactor housing consisting, at least in regions, of a material which is transparent for radiation of a wavelength of ≥180 nm, and the reaction plate having, at least in regions, a surface which comprises a material with negative electron affinity and which can be excited electronically with radiation of a wavelength of ≥180 nm, in which a) a liquid and the substance to be reduced are introduced into the device such that a liquid thin film is formed on the surface of the reaction plate, through which the substance to be reduced diffuses, b) the reaction plate is irradiated with light of a wavelength of ≥180 nm so that electrons are excited and emitted from the surface of the material with negative electron affinity, and c) the electrons reduce the substance to be reduced which diffuses through the liquid thin film.

24. The method according to claim 23, wherein the liquid thin film has a film thickness of 5 to 150 µm.

* * * * *